(12) United States Patent
Shore et al.

(10) Patent No.: US 8,221,693 B2
(45) Date of Patent: Jul. 17, 2012

(54) USE OF A RADIAL ZONE COATING TO FACILITATE A TWO-STAGE PROX SYSTEM WITH SINGLE AIR INJECTION

(75) Inventors: Lawrence Shore, Edison, NJ (US); Robert J. Farrauto, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 1198 days.

(21) Appl. No.: 11/194,816

(22) Filed: Aug. 1, 2005

(65) Prior Publication Data

US 2007/0025894 A1  Feb. 1, 2007

(51) Int. Cl.
*B01D 53/62* (2006.01)
(52) U.S. Cl. .......................... 422/211; 423/247; 422/222
(58) Field of Classification Search ................ 423/437.2, 423/246–247; 422/168–173, 187–197, 211, 422/222
See application file for complete search history.

(56) References Cited

U.S. PATENT DOCUMENTS

| | | | |
|---|---|---|---|
| 4,006,103 A * | 2/1977 | Meguerian et al. | 502/200 |
| 5,272,017 A | 12/1993 | Swathirajan et al. | 429/33 |
| 6,497,851 B1 * | 12/2002 | Hu et al. | 423/213.5 |
| 6,559,094 B1 | 5/2003 | Korotkikh et al. | 502/326 |
| 2002/0042344 A1* | 4/2002 | Kondo et al. | 502/527.19 |
| 2002/0131915 A1* | 9/2002 | Shore et al. | 422/177 |
| 2004/0037757 A1 | 2/2004 | Taguchi et al. | 422/188 |
| 2006/0143980 A1* | 7/2006 | Rapier et al. | 48/61 |

FOREIGN PATENT DOCUMENTS

| | | |
|---|---|---|
| EP | 1 184 336 A1 | 4/2000 |
| EP | 1 059 265 A2 | 6/2000 |
| GB | 2 367 067 A | 7/2001 |
| WO | WO 02/47805 * | 6/2002 |
| WO | WO 02/47805 A2 | 6/2002 |
| WO | WO 2004/022481 A1 | 3/2004 |

OTHER PUBLICATIONS

International Search Report PCT/US2006/027737.
XP002239315—"Carbon mono: oxidising device for fuel cells in which carbon monoxide is made to pass through multiple chambers in series and ha oxidising catalyst installed, etc." Derwent, Feb. 20, 1996.

* cited by examiner

*Primary Examiner* — Daniel C. McCracken
(74) *Attorney, Agent, or Firm* — Bernard Lau

(57) ABSTRACT

A two stage-carbon monoxide preferential oxidation article and method that uses a single injection of an $O_2$-containing gas.

7 Claims, 5 Drawing Sheets

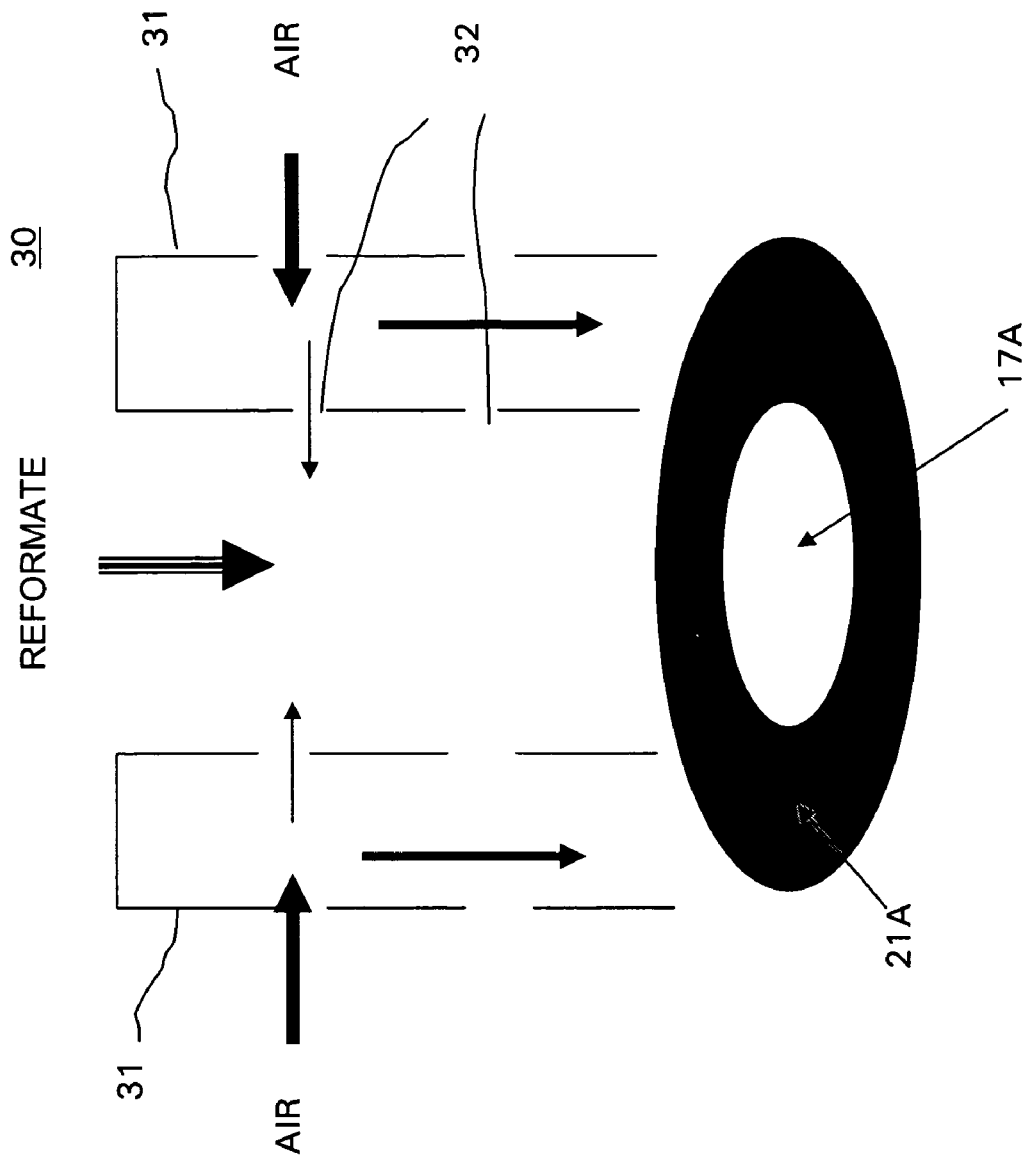

USE OF A RADIAL ZONE COATING TO FACILITATE A TWO-STAGE PROX SYSTEM WITH SINGLE AIR INJECTION

The present invention relates to articles and methods for the removal of carbon monoxide (CO) from a hydrogen-containing gas stream. In particular, the present invention relates to a two stage-carbon monoxide preferential oxidation article and method that uses a single injection of an $O_2$-containing gas.

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and nitric oxides.

Fuel cell processors (also known as fuel cell reformers) supply a hydrogen-containing gas stream to the fuel cell. Fuel cell processors include reactors that steam reform hydrocarbon feedstocks (e.g., natural gas, LPG) and hydrocarbon derivatives (e.g., alcohols) to produce a process stream enriched in hydrogen. Other by-products from the steam reforming of hydrocarbon include carbon monoxide and carbon dioxide. For example, methane is converted to hydrogen, carbon monoxide and carbon dioxide by the two reactions below:

$$CH_4 + H_2O \rightarrow 3H_2 + CO$$

$$CH_4 + 2H_2O \rightarrow 4H_2 + CO_2$$

The resulting gas is then typically reacted in the water-gas shift reactor where the process stream is further enriched in hydrogen by reaction of carbon monoxide in the water-gas shift reaction:

$$CO + H_2O \rightarrow CO_2 + H_2$$

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In a typical PEM fuel cell operation, hydrogen gas is electrolytically oxidized to hydrogen ions at the anode composed of platinum reaction catalysts deposited on a conductive carbon electrode. The protons pass through the ion exchange resin membrane, called a proton exchange membrane (PEM), which can be a fluoropolymer of sulfonic acid. Water is produced when protons then combine with oxygen that has been electrolytically reduced at the cathode. The electrons flow through an external circuit in this process to do work, creating an electrical potential across the electrodes. Examples of membrane electrode assemblies and fuel cells are described in U.S. Pat. No. 5,272,017.

The platinum electrodes at the anode of the PEM fuel cells are extremely sensitive to carbon monoxide, even when present at levels below 100 ppm in the hydrogen feed stream supplied to the fuel cell. Therefore, the level of carbon monoxide in the hydrogen feed stream supplied to the fuel cell is preferably reduced to as low a level as practical to maintain the fuel cell's efficiency. Preferably, the level of carbon monoxide in the hydrogen feed stream ultimately supplied to the fuel cell is below 100 ppm, more preferably the level is below 10 ppm.

The bulk of the carbon monoxide in the fuel processor is converted to hydrogen and water in the water-gas shift reactor. However, more complete removal of carbon monoxide from the process stream using solely the water-gas shift reaction is difficult to achieve due to both kinetic and equilibrium limitations. Additional purifying measures are used to achieve levels of carbon monoxide below 100 ppm in the process gas in the fuel processor.

One of the measures used to achieve acceptable levels of carbon monoxide in hydrogen feed streams includes treating the stream with small concentrations of oxygen in the presence of "preferential oxidation catalysts" (also known as "Prox" catalysts). These catalysts selectively oxidize residual carbon monoxide with oxygen in hydrogen gas streams according to the following reaction:

$$CO + \tfrac{1}{2}O_2 \rightarrow CO_2$$

wherein hydrogen may comprise greater than 60% by volume of the gas stream composition. An undesirable side reaction in this method is the oxidation of hydrogen according to the following reaction:

$$H_2 + \tfrac{1}{2}O_2 \rightarrow H_2O.$$

In order to consume as little hydrogen as possible, the oxidation process is preferably as selective as possible for the oxidation of carbon monoxide. Various catalyst compositions have been screened and various reactor design strategies have been designed in an effort to achieve the desired selectivity.

Certain of the effective preferential oxidation catalysts used in purifying hydrogen feed streams in fuel reformers are platinum group metal-based catalysts, e.g., platinum on an alumina support. As precious metals, such materials significantly contribute to the overall material costs in assembling the fuel cell reformer.

Platinum-based catalysts, such as those disclosed in U.S. Pat. No. 6,559,094 are able to treat hydrogen gas streams that contain significant concentrations of carbon monoxide, e.g., 0.75% by volume, with good selectivity to achieve levels of carbon monoxide below 50 ppm. Nevertheless, achieving threshold levels of carbon monoxide below 100 ppm using only a single stage platinum-based catalyst is difficult due to the reverse water-gas shift activity exhibited by platinum-based catalysts. The low space velocities of the input gas stream necessary to reach the equilibrium carbon monoxide concentration, the exothermic temperature rise from the Prox reaction, the long residence time and the high concentration of hydrogen and carbon dioxide begin to favor the reverse water-gas shift reaction. These conditions contribute to the detrimental formation of carbon monoxide, and thwart efforts to more completely remove carbon monoxide from the hydrogen gas stream.

Lowering levels of carbon monoxide below 10 ppm from input gas streams that contain higher levels of carbon monoxide (e.g., 0.2 to 2% by volume) by preferential oxidation processes typically requires at least two catalyst stages. These higher levels of carbon monoxide are frequently observed in reformate gases received from water-gas shift reactors. Generally, such two-stage processes are conducted by treating hydrogen streams in a first preferential oxidation stage having a first oxygen input to produce an intermediate gas stream, which is then treated in a second preferential oxidation stage with a second, smaller input of oxygen. The bulk of the carbon monoxide is typically oxidized in the first Prox stage whereas in the second Prox stage, the carbon monoxide is reduced to the desired level. The absolute amount of $O_2$ injected in the first Prox stage is typically higher than that used in the second Prox stage.

The requirement for multiple injections of air burdens the process with certain reactor design challenges. First, the complexity of the reactor design is increased due to the need for a second $O_2$ injector. Second, accurately adding and mixing small volumes of an $O_2$-containing gas into the intermediate hydrogen stream in the second Prox stage is difficult. This difficulty is exacerbated in smaller scale fuel cell processors where smaller volumes of reformate streams are processed.

Continuing improvements in the design of fuel processors, and in particular, to the design of the articles for the removal of the residual carbon monoxide from the hydrogen stream that is ultimately fed to the fuel cell, are desirable. Improvements to the carbon monoxide removal articles that simplify the design and reduce reactor costs and volumes are especially desirable.

SUMMARY OF THE INVENTION

According to the invention, there is provided a two stage-carbon monoxide preferential oxidation article and method, as defined in the claims below.

BRIEF DESCRIPTION OF THE DRAWINGS

FIG. 5 depicts a gas distributor that may be used to direct oxygen-containing reformate to the first and second upstream zones of an upstream chamber.

DEFINITIONS

The following terms shall have, for the purposes of this application, the respective meanings set forth below.

"BET surface area" means the Brunauer, Emmett, Teller method for determining surface area by $N_2$ adsorption. Unless otherwise specifically stated, all references herein to the surface area refer to the BET surface area.

"High surface area support" means support materials with a BET surface area that is approximately greater than 10 $m^2/g$, preferably greater than 150 $m^2/g$.

"Hydrogen streams" refer to gas stream containing at least 40%, and preferably at least 50% by volume of $H_2$.

"Inlet temperature" shall mean the temperature of test gas, fluid sample or fluid stream being treated immediately prior to initial contact of the test gas, fluid sample or fluid stream with a catalyst composition.

"Percent by volume" refers to the amount of a particular gas component of a gas stream, unless otherwise indicated, means the mole percent of the gas component of the gas stream as expressed as a volume percent.

"Single injection chamber" means that the injection chamber that is the sole location in the article where the $O_2$-containing gas is introduced for oxidation of the carbon monoxide.

"Substantially free of Prox catalyst," when used to describe a zone of the article means that the amount of Prox catalyst is so small that a negligible amount of carbon monoxide oxidation (i.e., less than 5% of the carbon monoxide gas contained therein) occurs as the reformate gas passes through the specified zone. Preferably, Prox catalyst is absent from the specified zone.

DETAILED DESCRIPTION OF THE INVENTION

Figure 1:
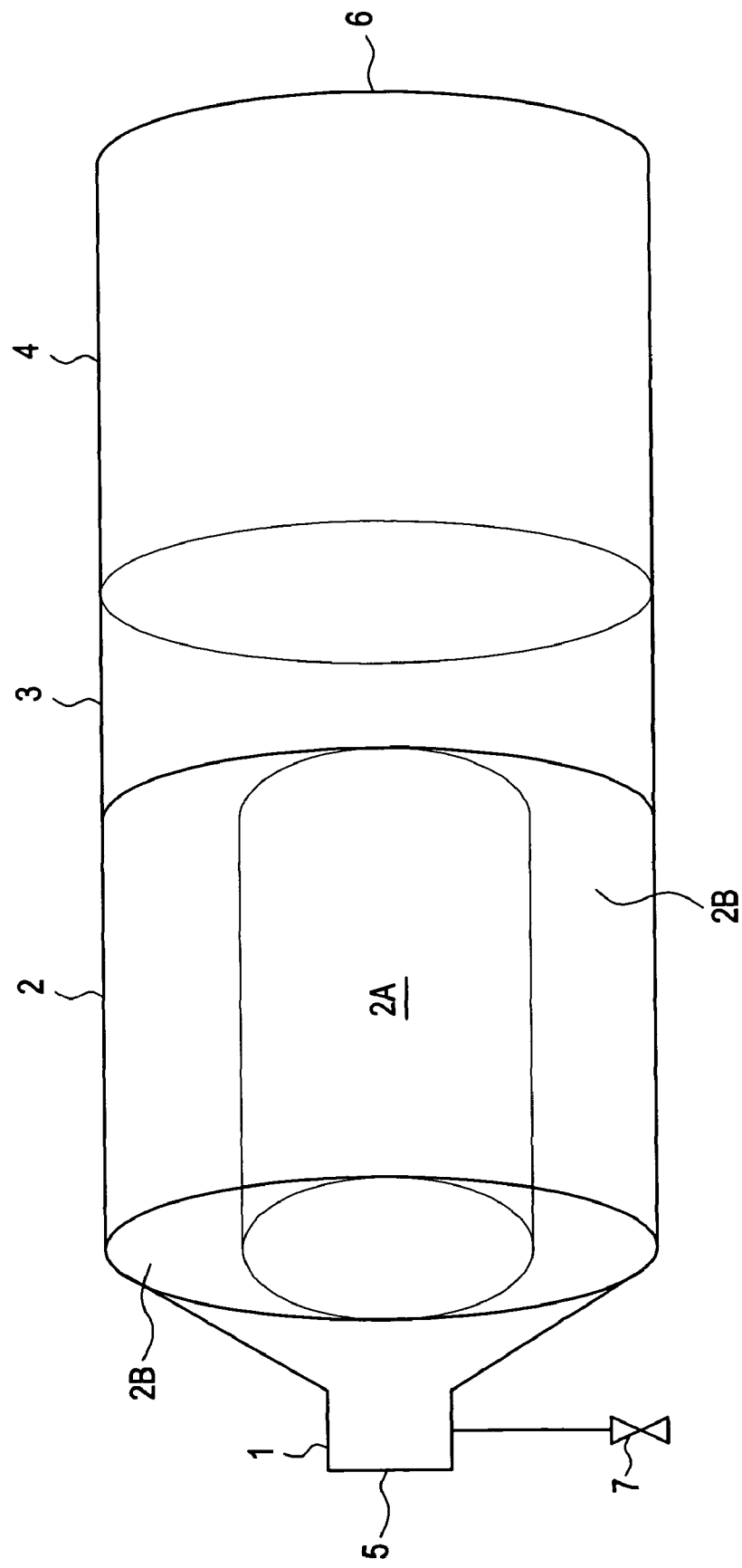
FIG. 1 is a schematic depiction of an example of a two stage-carbon monoxide preferential oxidation article.

A schematic representation of one embodiment of the inventive article is shown in FIG. 1. The article includes a container comprising a single injection chamber 1, an upstream chamber 2, a mixing chamber 3 and a downstream chamber 4. The injection chamber is in fluid connection with both the article inlet 5 and the upstream chamber. The mixing chamber is in fluid connection with both the upstream chamber and the downstream chamber. The downstream chamber is in fluid connection with the article outlet 6.

The injection chamber includes an injector 7 for adding an $O_2$-containing gas (e.g., air). The injection chamber provides the sole entry point for the injection of the $O_2$-containing gas. While it is unnecessary to equip the article with a second injector, for example, downstream of the upstream chamber, some performance benefits may be realized through the use of a second injector. Whether the performance benefits justify the complexity of a second injector can be determined by one of ordinary skill in the art.

In the embodiment depicted in FIG. 1, the upstream chamber has two zones, a first upstream zone 2A and a second upstream zone 2B. The first upstream zone contains an upstream Prox catalyst, whereas the second upstream zone is substantially free of Prox catalyst.

The downstream chamber contains a downstream Prox catalyst. The catalyst compositions used to form the upstream and downstream Prox catalysts may be the same or different.

In operation, the article can be used in a method of selectively removing carbon monoxide from an inlet gas stream, e.g., a hydrogen stream, containing carbon monoxide to form a purified hydrogen stream. The method includes adding a single injection of an $O_2$-containing gas to the inlet gas stream to adjust the $O_2$ concentration of the inlet stream to X, where "X" is a variable representing the $O_2$ concentration of the inlet gas stream after addition of the $O_2$-containing gas in the injection chamber. The inlet gas stream is then separated into first and second inlet gas streams. The first inlet gas stream is passed through the first upstream zone to contact the upstream Prox catalyst to selectively oxidize the carbon monoxide contained therein in preference to the hydrogen. The second inlet gas stream is passed through the second upstream zone to bypass contact with the upstream Prox catalyst.

The first and second inlet gas stream are combined in the mixing chamber 3 to form an intermediate gas stream having an $O_2$ concentration of less than 0.5×X. Preferably, the $O_2$ concentration of the intermediate gas stream is less than 0.3× X, and more preferably, the $O_2$ concentration is less than 0.2×X. The intermediate gas stream is then contacted with the downstream Prox catalyst to selectively oxidize the residual carbon monoxide contained therein to form the purified hydrogen stream which exits the article via the article outlet. The outlet may be, for example, in fluid communication with a fuel cell.

Removing the bulk of the carbon monoxide in the upstream stage and consuming most of the total absolute amount of $O_2$ injected in the inlet chamber assists in achieving the desired selectivity of the oxidation reactions. While a higher $O_2/CO$ ratio in the intermediate gas stream favors more complete carbon monoxide conversion in the second stage, a lower absolute concentration of $O_2$ in the intermediate gas stream minimizes the quantity of hydrogen consumed by non-selective oxidation. Furthermore, by minimizing the non-selective oxidation of hydrogen, the associated exotherm is also minimized. Effective management of the article's temperature preserves conditions that are favorable for the selective oxidation of carbon monoxide, and minimizes the risk of producing higher reactor temperatures which are favorable for reactions that consume hydrogen and produce carbon monoxide, including hydrogen oxidation and the reverse water-gas shift reaction.

Generally, the $O_2/CO$ ratio of the inlet gas stream is adjusted to be from about 1.0 to 3.0, and in preferred embodiments the $O_2/CO$ ratio is from 1.5 to 2.5. Similarly, the $O_2/CO$ ratio of the intermediate gas stream is adjusted to be from about 1.0 to 3.0, and in preferred embodiments the $O_2/CO$ ratio is from 1.5 to 2.5.

Generally, the space velocity of the gas stream through the article chambers is at least 1,000 $hr^{-1}$, and preferably the space velocity is at least 2,500 $hr^{-1}$. At lower space velocities using certain platinum group metal based Prox catalysts, the reverse water-gas shift reaction may thwart further efforts to reduce carbon monoxide in the product hydrogen stream, particularly in the downstream chamber.

Optimal gas temperatures for contacting the inlet and intermediate gas stream with the upstream Prox catalyst and downstream catalysts, respectively, will depend on the catalyst compositions employed in the method. Such optimal temperature can be readily determined by those of skill in the art, considering factor such as the concentration of the carbon monoxide in the reactant gas and the degree of conversion required. Temperatures for contacting the intermediate gas stream with the downstream Prox catalyst are generally from 40 to 200° C., and are preferably from about 90 to 120° C.

The methods of the invention can be conducted adiabatically (where the temperature of the reactor is allowed to rise due to the exothermic oxidation reaction) or isothermally (where the reactor temperature is maintained during the oxidation reaction). Due to the volume, weight and cost associated with equipping the article with heat exchange provisions, conducting the method adiabatically is preferred.

Figure 2:
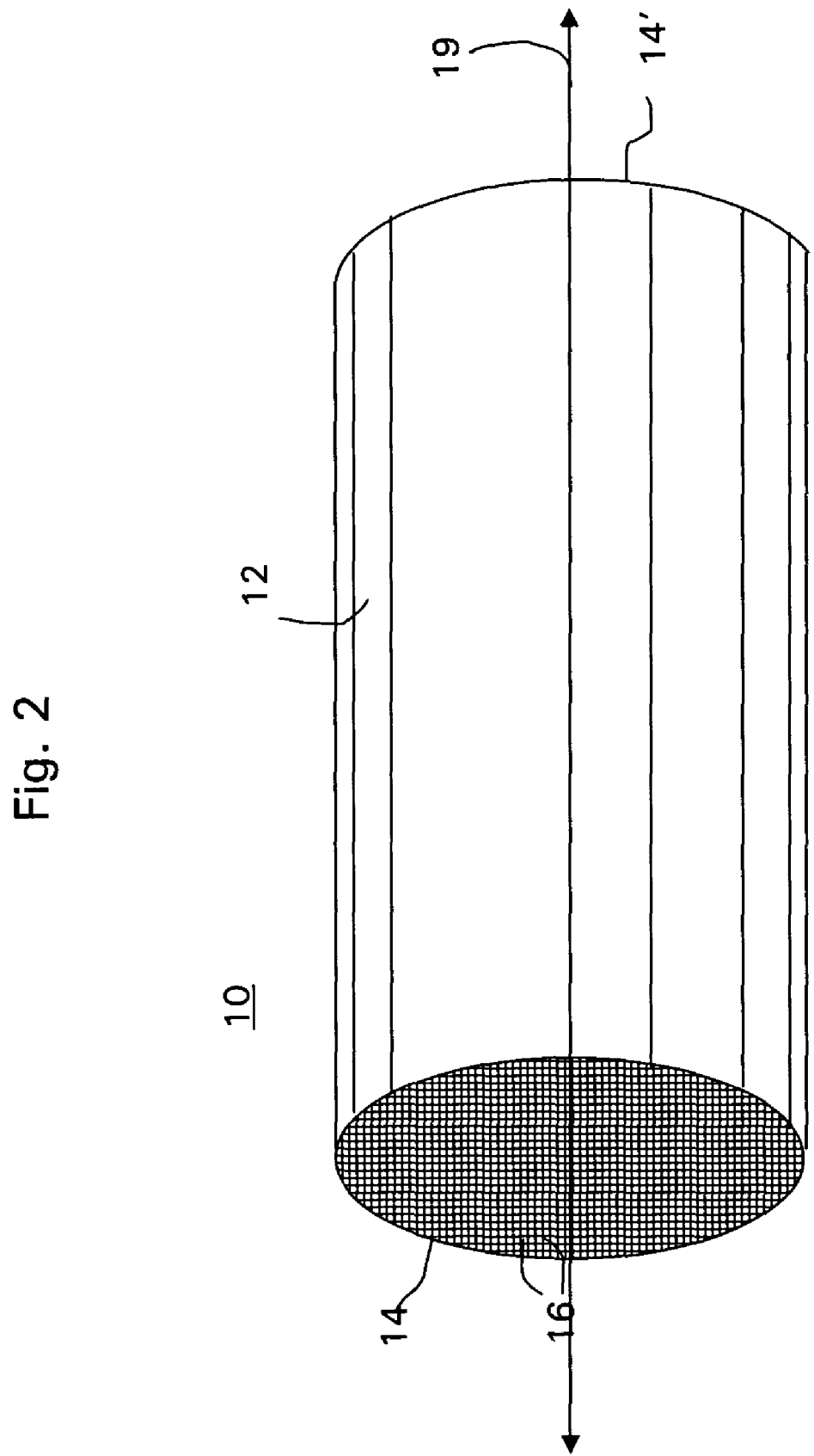
FIG. 2 depicts the two zones of an upstream chamber that may be used in a two stage-carbon monoxide preferential oxidation article.

FIG. 2 shows the two zones of the upstream chamber of a preferred embodiment of the inventive article. In this embodiment, the two zones of the upstream chamber are in the form of a single substrate 10 having an outer surface 12 and a plurality of channels 16 that extend from the substrate inlet 14 to the substrate outlet 14'. The substrate has an axis of symmetry (or simply, "axis") along the axial length of the substrate. Typically, a honeycomb monolith substrate is used in which the channels of the substrate are arranged in parallel. Each of the channels 16 are defined by the channel walls 18 of the substrate.

The plurality of channels include a first group of channels, which together form the first upstream zone of the article, and a second group of channels, which together form the second upstream zone of the article. The channel walls of the first group of channels are coated with the upstream Prox catalyst. The channel walls of the second group of channels are substantially free of Prox catalyst.

Figure 3B:
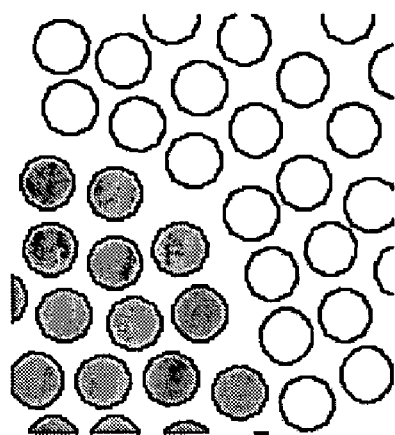
FIG. 3B is a cutaway depiction of an end-on view of the FIG. 3A substrate at the interface of the first and second upstream zones.
Figure 3A:
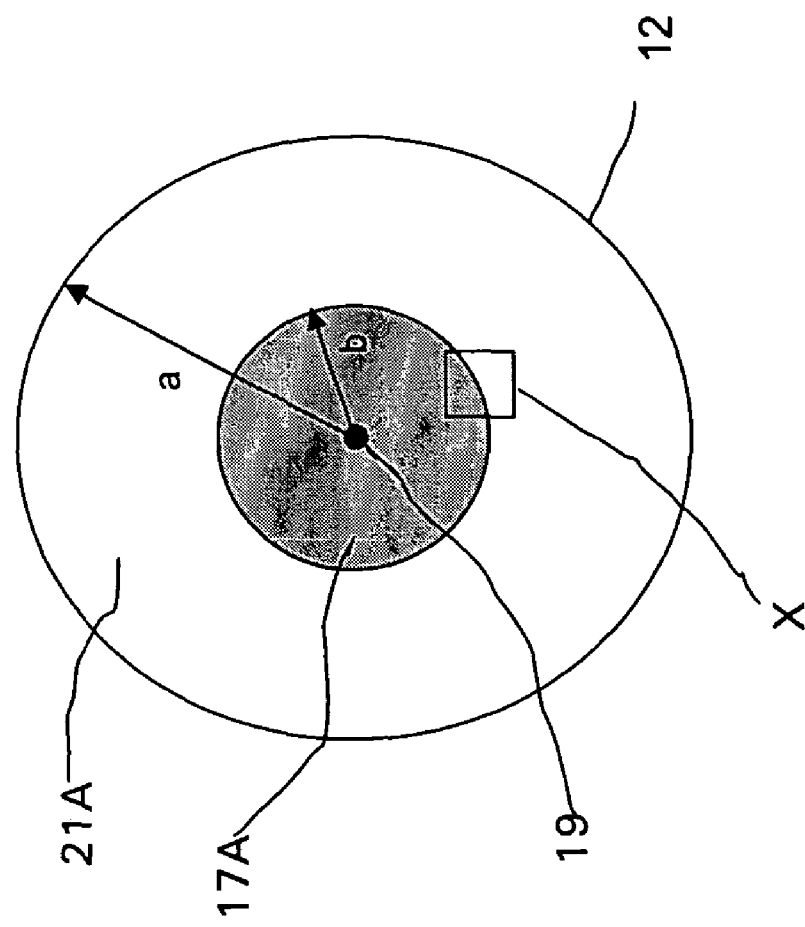
FIG. 3A depicts an arrangement of the first and second group of channels for a cylindrically-shaped substrate that may be used as an upstream chamber in a two stage-carbon monoxide preferential oxidation article.

The first and second group of channels may form a number of patterns when viewed end on from the inlet end of the substrate. For instance, FIG. 3A shows one preferred arrangement of the first and second group of channels for a cylindrically-shaped substrate. The first group of channels is in the form of a radial zone about the substrate's longitudinal axis. The radial zone formed by the first group of passages (the first upstream zone, 17A) has a radius "b" smaller than radius "a" of the substrate. The outer radial zone (or second upstream zone, 21A) is formed by the second group of passages (which form an annular pattern). FIG. 3B is a cutaway depiction of an end-on view of the substrate at the interface of the first and second upstream zones.

In alternative embodiments, the first upstream radial zone may be eccentrically positioned with respect to the substrate's longitudinal axis. Furthermore, the first upstream zone may be elliptically-shaped.

A desirable feature of designs that employ two zones in a single substrate is that a substantial cost-savings in the use of platinum group metal components can be realized in embodiments that use a honeycomb monolith substrate. The flow of the reactant gas through the substrate is often uneven with the bulk of the flow passing through a limited number of channels. This differential flow occurs because the inlet pipe generally has a much smaller diameter than does the catalyst substrate. For instance, where the inlet pipe is mounted concentrically relative to the substrate, the bulk of the gas stream flows through the center section of the catalyst. A radial coating design that disposes the Prox catalyst in the central core of the substrate accommodates the observed flow pattern, and thereby efficiently concentrates the Prox catalyst in the area where the bulk of the reactant gas flows.

Preferred substrates are made of a refractory, substantially inert, rigid material which is capable of maintaining its shape and a sufficient degree of mechanical conditions at high temperatures of about 1450° C. Typically, a material is selected for use as the substrate which exhibits a low thermal coefficient of expansion, good thermal shock resistance and preferably low thermal conductivity.

Two general types of materials of construction for monolith substrates are known. One is a ceramic-like porous material composed of one or more metal oxides, e.g., alumina, alumina-silica, alumina-silica-titania, mullite, cordierite, zirconia, zirconia-ceria, zirconia-spinel, zirconia-mullite, siliconcarbide, etc. A particularly preferred and commercially available material for use as the substrate conducting the pre-reforming method is cordierite, which is an alumina-magnesia-silica material.

Monolith substrates are commercially available in various sizes and configurations. Typically, the monolithic substrate would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to about 1,200, preferably 200-600, gas flow channels per square inch of face area.

The second major type of preferred material of construction for the monolith substrate is a heat- and oxidation-resistant metal, such as stainless steel or an iron-chromium alloy. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow channels, which may range, typically, from about 200 to about 1,200 per square inch of face area.

A number of different catalyst compositions can be used as Prox catalysts in the articles and methods of the invention. Preferred Prox catalysts possess a low reverse WGS liability and a low methanation liability, especially for the downstream chamber. Furthermore the operating temperature ranges of preferred Prox catalysts are below 120° C.

Preferential oxidation catalysts that are useful as either the upstream or downstream Prox catalysts include platinum group metal-based catalysts. Preferred platinum group metal components include platinum and/or ruthenium components. The platinum group metal is supported on an inorganic oxide support such as alumina, zirconia, ceria, silica, zeolite materials or combinations thereof. Preferably, there is about 1 to 5 wt. % of the platinum group metal in the catalyst composition. The supported platinum group metals are formed into washcoat compositions and disposed on substrates as described below.

A preferred platinum group metal composition is a platinum metal-based catalyst having an iron oxide promoter prepared as disclosed in United States U.S. Pat. No. 6,559,094, the disclosure of which is incorporated herein by reference. The catalyst has about 3 to 5 wt. % of platinum and about 0.1 to 0.5 wt. % iron in the composition. This preferred catalyst can oxidize carbon monoxide in a gas stream with excellent selectivity using minimal ratios of $O_2/CO$.

The platinum group metals are preferably dispersed on the inorganic oxide support using an impregnation procedure, wherein an aqueous mixture of a water-soluble or water-dispersible platinum group metal salt or complex, e.g., amine-solubilized platinum hydroxide, is used as a platinum group metal precursor. In embodiments of the invention wherein iron is present in the preferential oxidation catalyst composition, it can be dispersed on the support similarly using an iron salt or complex.

Analogous approaches can be taken to incorporate other components into the composition. The impregnated support is then dried and calcined to fix the platinum group metal and optional iron component on to the support. The calcined support can then be formed into washcoat compositions that are applied to substrate as described below. In preferred articles that are coated on honeycomb-type substrate containing a platinum-based, iron-promoted catalyst composition of the type described above, the loading of catalyst composition is typically in the range of about 0.5 to 3 $g/in^3$ with the platinum and optional iron components according to their relative weight percentages as described above.

Figure 4:
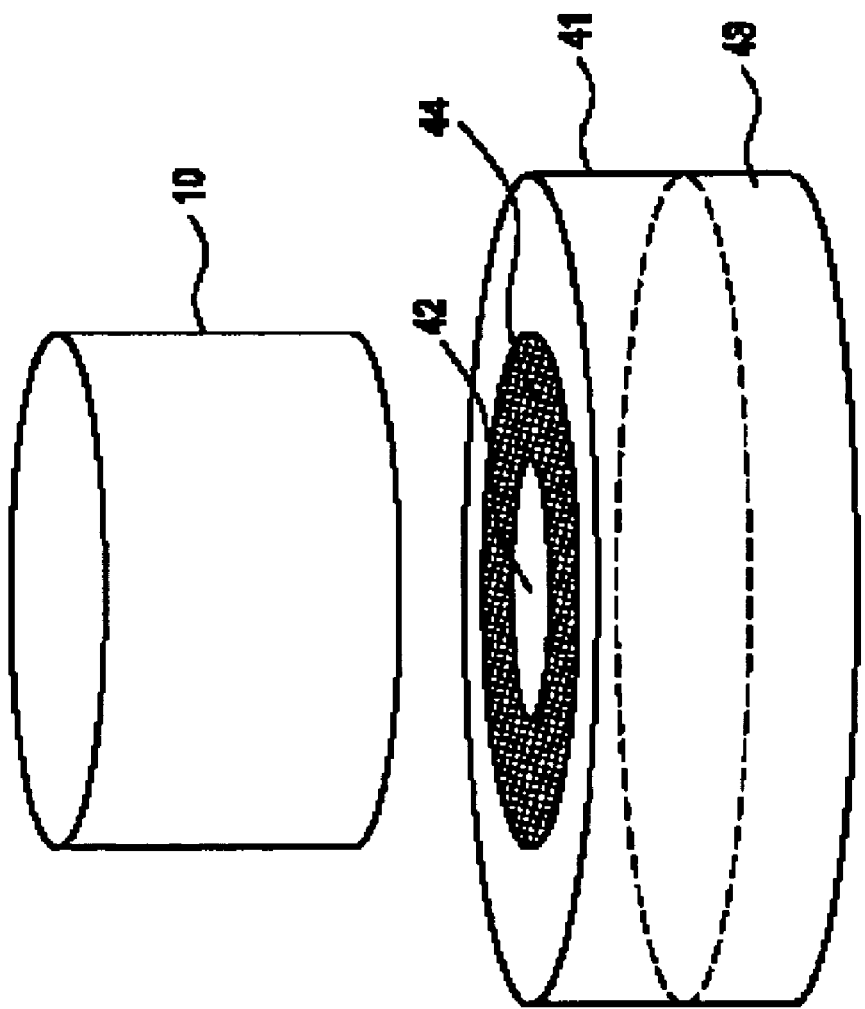
FIG. 4 depicts a dip pan that may be used with a metered charge coating device for selectively coating the first group of channels in a cylindrically-shaped substrate that may be used as an upstream chamber in a two stage-carbon monoxide preferential oxidation article.

A number of techniques can be used to selectively coat the first group of channels in embodiments of the invention having the design in FIG. 2. For example one method for selectively coating the first group of channels with a metered charge coating device uses a modified dip pan (41) that holds the coating slurry. For example, as shown in FIG. 4, the dip pan can have a circular insert with a central hole (42) so that when a catalyst slurry (43) is drawn up the substrate (10) the outer circumferential channels (e.g., second group of channels) remain uncoated, while the central channels (first group of channels) are coated. The dip pan can be provided with an adhesive surface (44) surrounding the central hole to prevent entry of the coating slurry (in the illustrated embodiment) in to the channels outside of the desired coating pattern. The inserts of the dip pan can be modified to provide any radial zone coating profile, such as an annulus or toroid. In another embodiment, although less desirable from the standpoint of time, the channels of each substrate that are to remain uncoated can be separately blanked off before being placed in the metered charge coating device.

In a preferred embodiment of the inventive article, the $O_2$ injector directs a greater proportion of $O_2$-containing gas to the second group of channels than the first group of passages. Feeding a greater proportion of the $O_2$-containing gas to the second group of channels ensures that a higher $O_2/CO$ ratio is achieved in the intermediate gas stream than was present in the inlet gas. A higher $O_2/CO$ ratio in the intermediate gas stream allows for higher carbon monoxide conversion in the downstream stage of the article.

Distinguishing the amount of the $O_2$-containing gas fed to the first and second group of channels can be achieved by using a gas distributor. As will be apparent to those of skill in the art, such gas distributors can use combinations of baffles, shrouds and guides to distinguish the amount of $O_2$-containing gas that enters the first and second group of channels. By way of example, for the honeycomb monolith substrate depicted in FIG. 3A, more $O_2$-containing gas would be directed toward the outer annular regions of the substrate that comprise the second group of passages. For instance, in one embodiment of the gas distributor 30 shown in FIG. 5, a cylindrical sleeve 31 is mounted concentrically with the substrate (that partially shields the inner radial zone that comprise the first group of passages). Apertures 32 in the inner wall of the sleeve 31 allow a portion of the $O_2$-containing gas to leak into the area feeding the first group of passages which contain the Prox catalyst, while the bulk of the $O_2$-containing gas feeds the second group of passages which are substantially free of Prox catalyst. In this preferred embodiment, a gap is provided between the gas distributor 30 and the inlet of the substrate to allow at least some mixing of the inlet gas with the $O_2$-containing gas before the inlet gas enters the channels of the substrate.

The invention also relates to methods for removing carbon monoxide from inlet gas streams that employ a gas distributor for directing a higher proportion of $O_2$-containing gas to the second upstream zone. The method includes separating the inlet gas stream into a first inlet gas stream and a second inlet gas stream. A single injection of an $O_2$-containing gas is split to direct a first portion of the $O_2$-containing gas to the first inlet gas stream to adjust the $O_2$ concentration of the first inlet stream to $X_1$, and a second portion of the $O_2$-containing gas to the second inlet gas stream to adjust the $O_2$ concentration of the second inlet stream to $X_2$, where "$X_1$" and "$X_2$" are variables representing the $O_2$ concentration of the first and second inlet gas streams, respectively after addition of the $O_2$-containing gas. Preferably $X_2$ is greater than $X_1$. The first inlet gas stream is then passed through a first upstream zone to contact the upstream Prox catalyst, while the second inlet gas stream is passed through a second upstream zone to bypass contact with the upstream Prox catalyst. The first and second inlet gas streams are then combined to form an intermediate gas stream having an $O_2$ concentration of less than $X_2$, for example, in a mixing chamber. The intermediate gas stream is then contacted with a downstream Prox catalyst to form the purified hydrogen stream.

The following examples further illustrate the present invention, but of course, should not be construed as in any way limiting its scope.

EXAMPLE 1

Evaluation of a Single-Stage Prox Catalyst Article (Reference Article R1)

The performance of a single-stage Prox article (Reference Article R1) was determined as a function of the temperature and space velocity. An inlet gas composition containing 50% $H_2$, 0.3% CO and 0.6% $O_2$ ($O_2$/CO ratio=2) was passed through a honeycomb monolith substrate coated with a preferential oxidation catalyst.

The preferential oxidation catalyst was prepared in the following manner: SBA-150 alumina powder was impregnated with a solution containing an ammine complex of platinum. Using the incipient wetness method, 2% of Pt was added by weight to the alumina; a volume of a 5% acetic acid solution was added to the impregnation solution to equal 20% of the incipient wetness. The powder was then dried for two hours at 120° C. and calcined for two hours at 500° C. The powder was then impregnated with a solution of copper nitrate. Using the incipient wetness method, 8% of copper was added by weight to the alumina previously loaded with Pt. The powder was dried at 120° C. for two hours, then calcined at 300° C. for two hours.

The alumina powder was then ballmilled with water to make a slurry containing 30% solids. The powder and water were placed in a ball mill along with grinding media. The ball mill was rotated as required so that the 90% of the particles were <10 um. At this point, the slurry was transferred to a container. The monolithic catalyst support was weighed, then was dipped into the slurry; excess slurry was removed using a flow of air. The catalyst was dried and calcined, at 120° C. and 300° C., respectively. The dry gain of the slurry was determined by the change in weight of the support. The targeted weight gain is 2 g/in$^3$.

The outlet CO concentration from the trials are shown in Table 1.

TABLE 1

| Space Velocity | Inlet Temperature (° C.) | Outlet [CO] (ppm) |
|---|---|---|
| 12 k/hr | 100 | 6 |
| 12 k/hr | 105 | 12 |
| 12 k/hr | 110 | 27 |
| 20 k/hr | 100 | 8 |
| 20 k/hr | 105 | 19 |
| 20 k/hr | 110 | 60 |
| 30 k/hr | 100 | 7 |
| 30 k/hr | 105 | 10 |
| 30 k/hr | 110 | 26 |

The data in Table 1 shows that the performance of Reference Article R1 was variable depending on the combination of the space velocity and inlet temperature. A small variation away from the optimum conditions, in this case inlet temperature, resulted in failing to achieve a concentration of <10 ppm CO in the product gas stream.

EXAMPLE 2

Model Study Simulating the Performance of the Downstream Chamber Having a Downstream Prox Catalyst This experiment was performed to determine the feasibility of a two-stage Prox article equipped with provisions a bypass zone and upstream catalyst zone. The experiment simulated conditions where a partially treated reformate stream (or intermediate gas stream) has been cooled and homogenized. Using Reference Article R1 as described in Example 1, trials were conducted using an estimated bypass of 20% and 40%, respectively, and at three different space velocities. At each combination of space velocity and bypass, trials at three different inlet temperatures were run.

TABLE 2

| Space Velocity | Inlet Temperature (° C.) | % Bypass | Inlet [CO], % | Inlet [$O_2$], % | Outlet [CO], ppm |
|---|---|---|---|---|---|
| 12 k/hr | 100 | 19 | 0.060 | 0.12 | <1 |
| 12 k/hr | 105 | 19 | 0.060 | 0.12 | 1.6 |
| 12 k/hr | 110 | 19 | 0.060 | 0.12 | 3.2 |
| 12 k/hr | 100 | 40 | 0.12 | 0.24 | <1 |
| 12 k/hr | 105 | 40 | 0.12 | 0.24 | 2.0 |
| 12 k/hr | 110 | 40 | 0.12 | 0.24 | 4.5 |
| 20 k/hr | 105 | 19 | 0.060 | 0.12 | <1 |
| 20 k/hr | 110 | 19 | 0.060 | 0.12 | 2.0 |
| 20 k/hr | 115 | 19 | 0.060 | 0.12 | 5 |
| 20 k/hr | 105 | 40 | 0.12 | 0.24 | 1.4 |
| 20 k/hr | 110 | 40 | 0.12 | 0.24 | 3.4 |
| 20 k/hr | 115 | 40 | 0.12 | 0.24 | 9 |
| 30 k/hr | 105 | 19 | 0.060 | 0.12 | <1 |
| 30 k/hr | 110 | 19 | 0.060 | 0.12 | 1.0 |
| 30 k/hr | 115 | 19 | 0.060 | 0.12 | 3.2 |
| 30 k/hr | 105 | 40 | 0.12 | 0.24 | 2.4 |
| 30 k/hr | 110 | 40 | 0.12 | 0.24 | 2.3 |
| 30 k/hr | 115 | 40 | 0.12 | 0.24 | 5.6 |

The data presented in Table 2 substantiates the bypass concept. The product gas stream exiting from the simulated downstream catalyst chamber contained CO concentrations <10 ppm, and in most cases <5 ppm. In comparison to Reference Article R1, the model Article exhibited a decreased sensitivity to changes in the space velocity and the inlet temperature. The decreased sensitivity was exhibited even in trials conducted where 40% of the original CO concentration was present in the gas stream entering the simulated downstream stage of the article.

EXAMPLE 3

Model Study Simulating the Performance of the Downstream Chamber Having a Downstream Prox Catalyst Additional studies were conducted to support the bypass concept. Using Reference Article R1 described in Example 1, the inlet temperature was held constant in the trials, while differing percentages of bypass were used. It was assumed that the original reformate (inlet gas stream) contained 0.3% CO and 0.6% $O_2$.

TABLE 3

| Space Velocity | Inlet Temperature (° C.) | Inlet [CO], % | Inlet [$O_2$], % | Theoretical, % Bypass | Outlet [CO], ppm |
|---|---|---|---|---|---|
| 12 k/hr | 110 | 0.060 | 0.12 | 19 | 4.9 |
| 12 k/hr | 110 | 0.095 | 0.19 | 31 | 4.4 |
| 12 k/hr | 110 | 0.12 | 0.24 | 40 | 5.1 |
| 20 k/hr | 110 | 0.056 | 0.11 | 18 | <3 (2.5) |
| 20 k/hr | 110 | 0.090 | 0.18 | 30 | 3 |
| 20 k/hr | 110 | 0.12 | 0.24 | 40 | 4.5 |
| 30 k/hr | 110 | 0.060 | 0.12 | 19 | 1.2 |
| 30 k/hr | 110 | 0.090 | 0.18 | 30 | 1.8 |
| 30 k/hr | 110 | 0.12 | 0.24 | 40 | 3 |

The data showed minimal influence of space velocity on outlet CO concentration over the range covered, all other variables being held constant. The data indicate that variation in the design of the bypass using the radial zone coating process will have little impact on the overall CO conversion efficiency.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A two stage carbon monoxide preferential oxidation article, comprising
a container, the container comprising:
an article inlet for an inlet gas stream;
an article outlet;
an upstream chamber comprising a substrate having a plurality of channels that extend from the substrate inlet to the substrate outlet, wherein each of the channels is enclosed by the channel walls of the substrate; and the plurality of channels comprise a first group of channels which form a first upstream zone and a second group of channels which form a second upstream zone, wherein the channel walls of the first group of channels have an upstream Prox catalyst, and the channel walls of the second group of channels are substantially free of Prox catalyst; and wherein a first portion of the inlet gas stream passes through the first upstream zone as a first inlet gas stream and a second portion of the inlet gas stream passes through the second upstream zone as a second inlet gas stream;
a single injection chamber having an $O_2$ injector for injecting an $O_2$-containing gas to adjust the $O_2$ concentration of the inlet gas stream, wherein the single injection chamber is in fluid communication with the article inlet and the upstream chamber, wherein the injection chamber is the sole location for $O_2$-containing gas injection;
a downstream chamber comprising a downstream Prox catalyst, wherein the downstream chamber is in fluid communication with the article outlet; and
a mixing chamber between the upstream and downstream chambers, wherein the mixing chamber is in fluid communication with the upstream and downstream chambers, and wherein the first inlet gas stream and the second inlet gas stream combine in the mixing chamber to form an intermediate gas stream.

2. The article of claim 1, wherein the $O_2$ injector is capable of directing a greater proportion of an $O_2$-containing gas to the second group of channels than the first group of channels.

3. The article of claim 1, wherein the second group of channels are disposed in an annular pattern about the substrate's longitudinal axis.

4. The article of claim 3, wherein the $O_2$ injector is capable of directing a greater proportion of an $O_2$-containing gas to the second group of channels than the first group of channels.

5. The article of claim 4, wherein the $O_2$ injector further comprises a gas distributor.

6. A method of removing carbon monoxide from an inlet gas stream comprising hydrogen and carbon monoxide to form a purified hydrogen stream, the method comprising:
introducing a gas stream containing hydrogen and carbon monoxide into a two stage carbon monoxide preferential oxidation article of claim 1, wherein said gas stream is introduced into said article through said article inlet to form an inlet gas stream and wherein a first portion of the inlet gas stream passes through the first upstream zone having a Prox catalyst as a first inlet gas stream and a second portion of the inlet gas stream passes through the second upstream zone substantially free of Prox catalyst as a second inlet gas stream;
optionally adding a single injection of an $O_2$-containing gas to the inlet gas stream to adjust the $O_2$ concentration of the inlet stream to X;
combining the first and second inlet gas streams to form an intermediate gas stream having an $O_2$ concentration of less than 0.5x; and
contacting the intermediate gas stream with the downstream Prox catalyst to form the purified hydrogen stream.

7. A method of removing carbon monoxide from an inlet gas stream comprising hydrogen and carbon monoxide to form a purified hydrogen stream, the method comprising:
introducing a gas stream containing hydrogen and carbon monoxide into a two stage carbon monoxide preferential oxidation article of claim 1, wherein said gas stream is introduced into said article through said article inlet and wherein a first portion of the inlet gas stream passes through the first upstream zone as a first inlet gas stream and a second portion of the inlet gas stream passes through the second upstream zone as a second inlet gas stream;
splitting a single injection of an $O_2$-containing gas to direct a first portion of the $O_2$-containing gas to the first inlet gas stream to adjust the $O_2$ concentration of the first inlet stream to $X_1$, and a second portion of the $O_2$-containing gas to the second inlet gas stream to adjust the $O_2$ concentration of the second inlet stream to $X_2$, wherein $X_2 > X_1$;
combining the first and second inlet gas streams to form an intermediate gas stream having an $O_2$ concentration of less than $X_2$; and
contacting the intermediate gas stream with the downstream Prox catalyst to form the purified hydrogen stream.

* * * * *